US008789099B2

(12) United States Patent
Foote

(10) Patent No.: US 8,789,099 B2
(45) Date of Patent: Jul. 22, 2014

(54) VISUAL CUE FOR PROGRAMS IN AN ELECTRONIC PROGRAM GUIDE

(75) Inventor: Evan Michael Foote, Carmel, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/993,701

(22) PCT Filed: Jan. 25, 2011

(86) PCT No.: PCT/US2011/000132
§ 371 (c)(1),
(2), (4) Date: Jun. 13, 2013

(87) PCT Pub. No.: WO2012/102689
PCT Pub. Date: Aug. 2, 2012

(65) Prior Publication Data
US 2013/0268966 A1    Oct. 10, 2013

(51) Int. Cl.
*G06F 3/00* (2006.01)
*G06F 13/00* (2006.01)
*H04N 5/445* (2011.01)
*H04N 21/482* (2011.01)
*H04N 21/431* (2011.01)

(52) U.S. Cl.
CPC .. *H04N 21/4821* (2013.01); *H04N 2005/44556* (2013.01); *H04N 5/44543* (2013.01); *H04N 21/4312* (2013.01)
USPC ............... 725/39; 725/37; 725/38; 725/40

(58) Field of Classification Search
USPC .......................................... 725/37, 38, 39, 40
See application file for complete search history.

(56) References Cited

U.S. PATENT DOCUMENTS

| 5,585,838 | A | * | 12/1996 | Lawler et al. ............... 725/54 |
| 5,844,620 | A | * | 12/1998 | Coleman et al. ............ 725/54 |
| 6,075,575 | A | * | 6/2000 | Schein et al. ............ 348/734 |
| 6,118,492 | A | * | 9/2000 | Milnes et al. ............. 725/52 |
| 6,412,110 | B1 | * | 6/2002 | Schein et al. ............. 725/40 |
| 7,051,353 | B2 | | 5/2006 | Yamashita et al. |
| 7,062,777 | B2 | * | 6/2006 | Alba et al. ................ 725/39 |

(Continued)

FOREIGN PATENT DOCUMENTS

| JP | 9331485 | 12/1997 |
| JP | 2000029876 | 1/2000 |
| WO | WO9948287 B1 | 9/1999 |

OTHER PUBLICATIONS

International Search Report mailed Sep. 22, 2011.

*Primary Examiner* — Robert Hance
(74) *Attorney, Agent, or Firm* — Robert D. Shedd; Robert B. Levy

(57) ABSTRACT

An electronic program guide includes a plurality of elements arrayed in a grid of rows and columns, with the rows corresponding to program sources and the columns corresponding to time intervals. Each element corresponds to a program played out from a particular program source during a corresponding time interval. The background of each element changes, such as by way of a color gradient or changing shape, to indicate one of a program beginning or ending. In this way, a viewer can ascertain the length of the program even if the element gets clipped upon updating the electronic program guide.

2 Claims, 5 Drawing Sheets

(56) References Cited

U.S. PATENT DOCUMENTS

| | | | |
|---|---|---|---|
| 7,200,854 B2 | 4/2007 | Moir | |
| 2001/0010094 A1* | 7/2001 | Moir | 725/39 |
| 2001/0016945 A1* | 8/2001 | Inoue | 725/44 |
| 2002/0087982 A1* | 7/2002 | Stuart | 725/39 |
| 2002/0144264 A1* | 10/2002 | Broadus | 725/39 |
| 2008/0320523 A1 | 12/2008 | Morris et al. | |
| 2009/0077590 A1 | 3/2009 | Nielen | |
| 2009/0309892 A1 | 12/2009 | Uehori et al. | |

\* cited by examiner

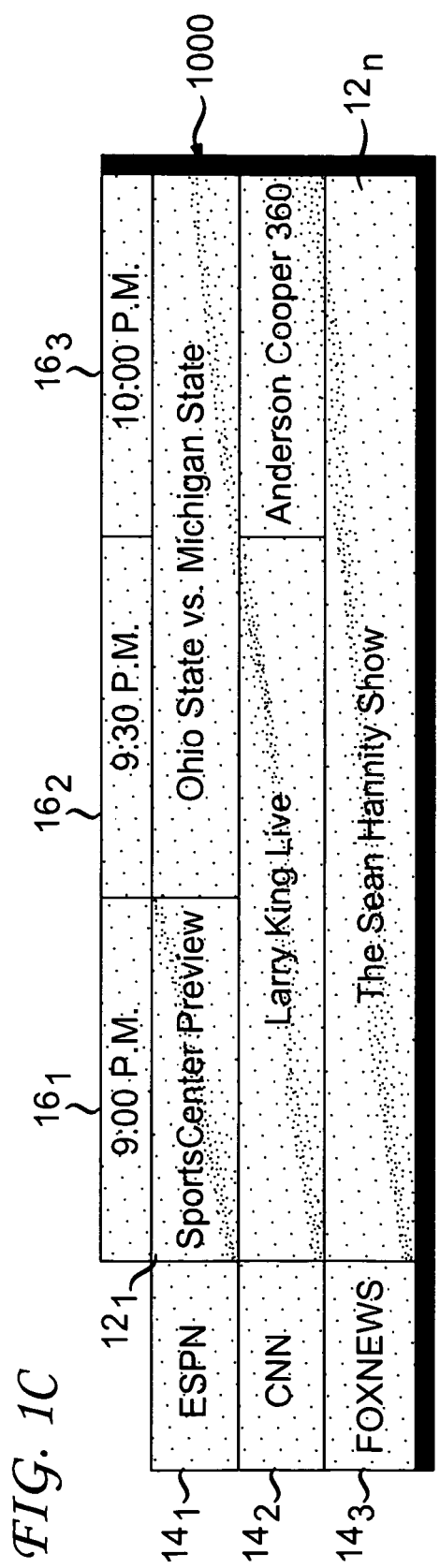

VISUAL CUE FOR PROGRAMS IN AN ELECTRONIC PROGRAM GUIDE

This application is a National Stage Application and claims the benefit, under 35 U.S.C. § 365 of International Application PCT/US2011/00132 filed Jan. 25, 2011 which was published in accordance with PCT Article 21(2) on Aug. 2, 2012 in English.

TECHNICAL FIELD

This invention relates to a technique for displaying program information in an Electronic Program Guide.

BACKGROUND ART

Virtually all cable television and satellite television companies provide subscribers with an Electronic Program Guide (EPG) which provides a display of content available on each of a plurality of channels. In practice, present-day EPGs comprise a grid array of rows and columns. In some program guides, the rows corresponds to the available content sources (e.g., ABC, NBC, CBS, ESPN, HBO, Showtime, etc.), whereas the columns correspond to time intervals, usually in one-half hour increments. In other program guides, the columns correspond to the content sources, whereas the rows correspond to time intervals. In either arrangement, an element in a particular row and column identifies the content currently provided by the content source during a corresponding time interval.

As time passes, the EPG updates itself and will no longer display the row or column associated with the just-elapsed time interval. Thus, the "earliest" time interval within the EPG corresponds to the time interval encompassing the current time. For example when the current time is 8:10 PM, then the earliest time interval will correspond to the V2 segment starting at 8:00 PM and ending at 8:30 PM. Similarly, at 9:35 PM, the earliest time interval appearing in the EPG will correspond to the ½ hour interval between 9:30 PM and 10 PM.

The updating of the EPG to delete the row or column associated with the just-elapsed time interval will prevent the subscriber from determining from the EPG itself the length of a television program or movie which began in the past. This will become better understood from the following example. Consider a 2-hour movie whose playout began at 7:30 PM on HBO. At 9:00 PM, the EPG would indicate that this movie on HBO is still playing out during the interval between 9:00 PM and 9:30 PM. Thus, a subscriber viewing the EPG at this time would have no information regarding the starting point or the duration of the movie. A similar problem exists when the user scrolls through the EPG to a future time.

Thus, a need exists for an EPG that indicates the length of a program that spans beyond the currently displayed portion of the guide.

BRIEF SUMMARY OF THE INVENTION

Briefly, in accordance with a preferred embodiment of the present principles, a method for generating an electronic program guide commences by forming a grid array of elements, at least one element having a foreground legend identifying at least a portion of a program from a particular program source appearing during a time interval. The at least one element includes a background which changes in a manner to indicate at least one of a program beginning and ending. In this way, a viewer observing a currently displayed portion of the program guide can gain an appreciation of the length of the program from the change in background of the element associated with that program.

BRIEF DESCRIPTION OF THE DRAWINGS

FIGS. 1A-1C different embodiments of an electronic program guide which provides an indication of program length spanning beyond the currently displayed portion of the guide;

DETAILED DESCRIPTION

Figure 1A:
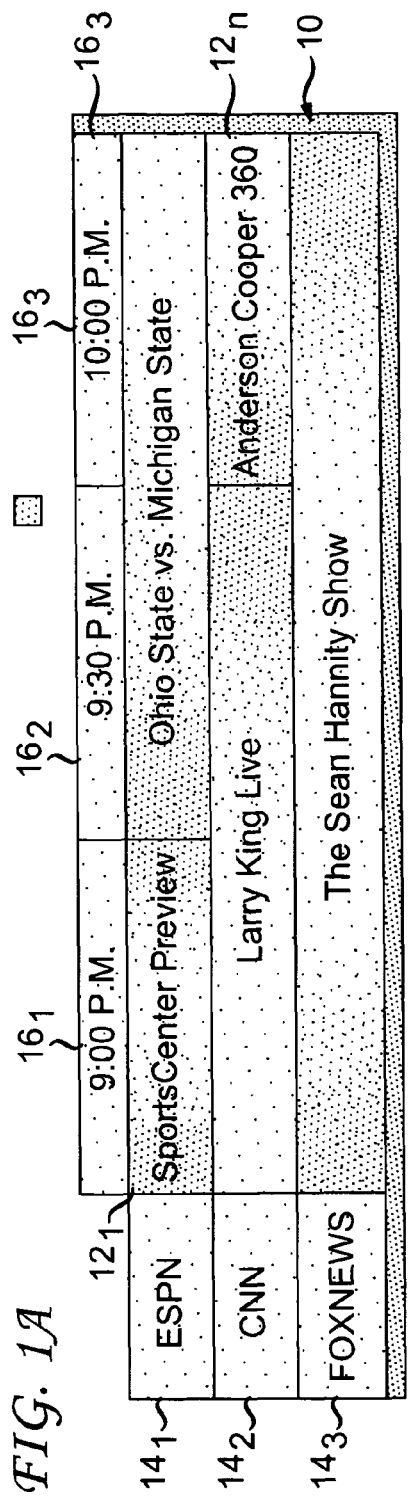

FIG. 1A depicts a first embodiment 10 of an Electronic Program Guide (EPG) in accordance with the present principles for providing an indication of the length of a program spanning beyond the currently displayed portion of the EPG. The EPG 10 of FIG. 1A comprises a rectangular array of elements $12_1$-$12_n$ arranged in rows and columns. For ease of description, the array depicted in FIG. 1A comprises 3 rows by 3 columns, although the size could be smaller or larger depending on design preferences. The rows $14_1$-$14_3$ of the array comprising the EPG 10 correspond to different program sources, exemplified by ESPN, CNN and FOX NEWS, respectively. The columns $16_1$-$16_3$ correspond to different time intervals, exemplified by 9:00 PM, 9:30 PM and 10:00 PM, respectively. Note that the arrangement of rows and columns in FIG. 1A could be reversed. In other words, the rows and columns of the array 10 of FIG. 1A could correspond to time intervals and program sources, respectively. The elements $12_1$-$12_n$ of the grid array 10 each corresponds to a program from a particular program source that appears during a particular time interval. The size of each element will vary with the program duration. Thus, an element representing a program one hour in duration will have twice the size compared to an element representing a program a half-hour duration. Given that the EPG 10 undergoes updating to reflect the passage of time, the actual size of each element appearing in the grid array of the EPG will change depending on the time remaining in the program. Thus, an element which represented a program one-hour in duration will shrink to one-half its size, after a half-hour has elapsed since the start of the program.

Each of the elements $12_1$-$12_n$ in the grid array contains a legend identifying the program from the program source appearing in during the corresponding time interval. Thus, for example, element $12_1$ contains the legend "Sports Center Preview" to identify the program broadcast by ESPN during the interval 9:00 PM-9:30 PM.

In accordance with the present principles, each of the each elements $12_1$-$12_n$ of the array 10 of the EPG of FIG. 1A has a background that changes in a manner to indicate at least one of a program beginning and ending. In EPG 10 of FIG. 1A, the background of each element employs a color gradient for this purpose. For example, the color of the background of each element in FIG. 1 appears darker both at the beginning and end of the program and lighter in the middle of the program. Thus, as the EPG 10 of FIG. 1 undergoes updating resulting in deletion of a column in the array 10 representing an elapsed time interval, a viewer can still judge the amount of time remaining for a continuing program, that is, a program that started during an interval no longer displayed by the EPG 10.

Figure 1B:
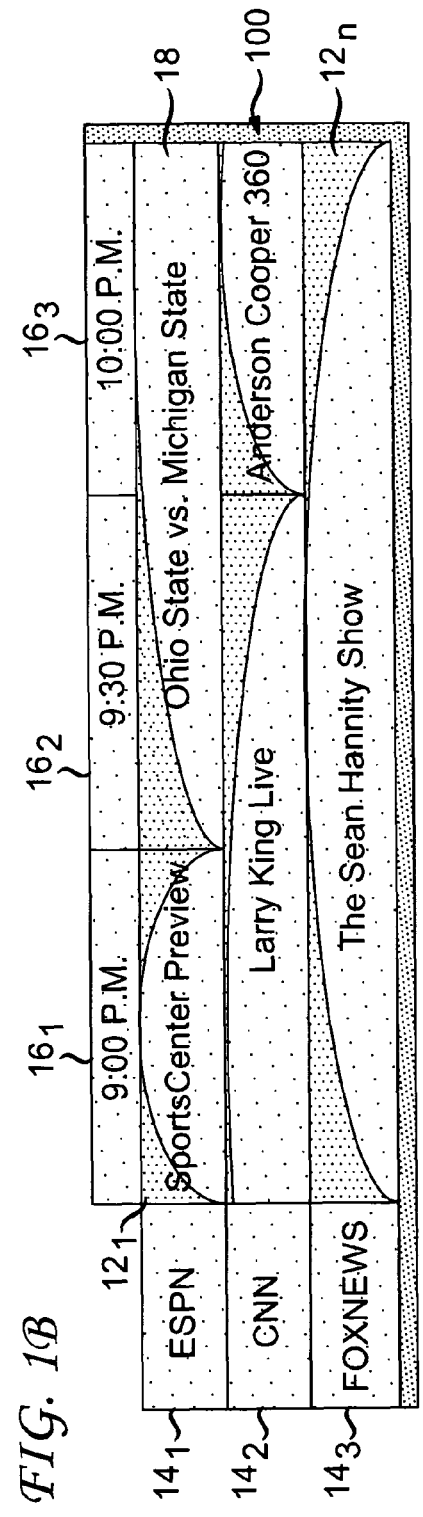

FIG. 1B depicts a second embodiment 100 of an EPG in accordance with the present principles. Like the EPG 10 of FIG. 1A, the EPG 100 of FIG. 1B comprises a grid array of elements $12_1$-$12_n$ arranged in rows in columns. The rows of the EPG 100 of FIG. 1B correspond to program sources, whereas the columns correspond to time intervals, just as with the EPG 10 of FIG. 1A. Also, like the EPG 10 of FIG. 1A, the elements $12_1$-$12_n$ of the EPG 100 of FIG. 1B each include a legend identifying the program played out from a particular program source during a corresponding time interval.

In accordance with the present principles, the elements $12_1$-$12_n$ of the EPG 100 of FIG. 1B each have a background that changes in a manner to indicate at least one of a program beginning and ending. Rather than making use of a color gradient as with the EPG 10 of FIG. 1A, the background of each of the elements $12_1$-$12_n$ of the EPG 100 of FIG. 1B contains a shape 18, e.g., a half-oval that spans the original length of each element. Thus, if the original element represented a program one hour in duration, the shape would span the hour time interval. As the element shrinks in size upon updating of the EPG 100, only a portion of the original shape will remain, depending on how much time has elapsed since the beginning of the program.

The half-oval shape 18 within each of the elements $12_1$-$12_n$ of the EPG 100 typically possesses a contrasting color as compared to the background of the element. By observing how much of the half-oval shape 18 remains in a given element, a viewer can gauge how much of the program has already elapsed.

FIG. 1C depicts a third embodiment 1000 of an EPG in accordance with the present principles. Like the EPG 10 of FIG. 1A and the EPG 100 of FIG. 1B, the EPG 1000 of FIG. 1C comprises a grid array of elements $12_1$-$12_n$ arranged in rows in columns. The rows of the EPG 1000 of FIG. 1C correspond to program sources, whereas the columns correspond to time intervals. Also, like the EPG 10 of FIG. 1A and the EPG 100 of FIG. 1B, the elements $12_1$-$12_n$ of the EPG 1000 of FIG. 1C each include a legend identifying the program from the program source appearing in the corresponding time interval.

In accordance with the present principles, the elements $12_1$-$12_n$ of the EPG 1000 of FIG. 1C each has a background that changes in a manner to indicate at least one of a program beginning and ending. Like the EPG 100 of FIG. 1B, the EPG 1000 of FIG. 1C makes use of a shape in each element to indicate one of the start and end of a program. However, rather than make use of a half-oval as with the EPG 100 of FIG. 1B, the EPG 1000 of FIG. 1C makes use of two triangles with opposite gradients spanning the theoretical opposing opposite corners of each element.

Figure 2:
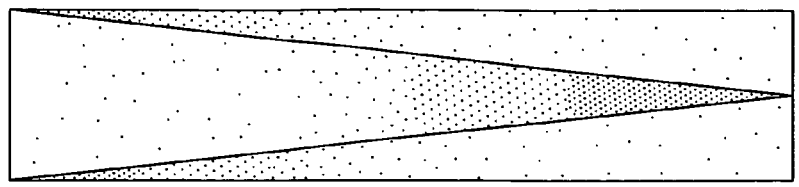
FIGS. 2-7 graphically depict the steps associated with creating the different embodiments of the program guides of FIGS. 1A-1C.
Figure 3:
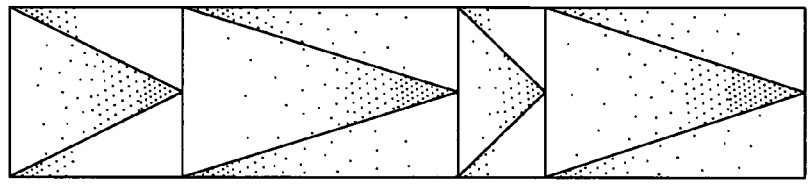
Figure 4:
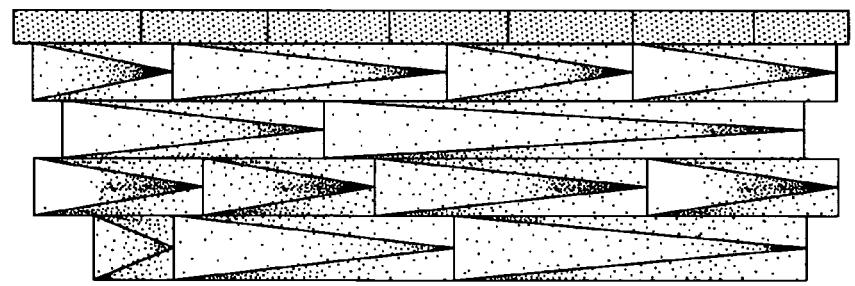
Figure 5:
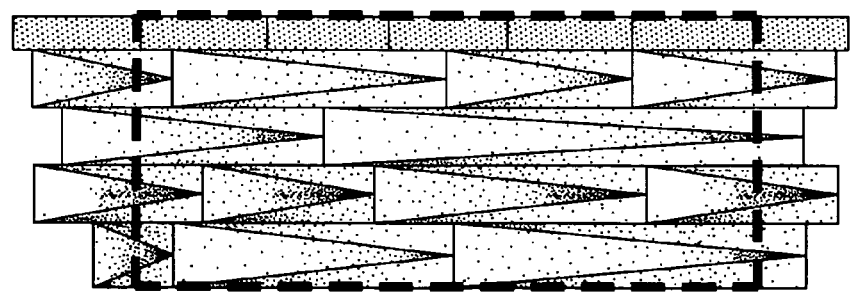

FIGS. 2-7 depict in sequence the steps associated with creating the EPG of the present principles. First, as depicted in FIG. 2, a basic pattern is selected. As seen in FIG. 2, that pattern can comprise a horizontally-oriented triangle, although other shapes could be selected. Referring to FIG. 3, the selected shape is repeated for the elements associated with a given program source (i.e., channel), with the shapes in the elements proportionately sized to the length of the program. As seen in FIG. 4, the elements associated with each program source get arrayed with the elements associated with the other program sources so that the elements associated with a given program source align with the elements of the other program sources for the corresponding time intervals. Referring to FIG. 5, a window is created to encompass the elements associated with the program sources, with the start and end times clipped to make the data within the window current with respect to the current time.

Figure 6:
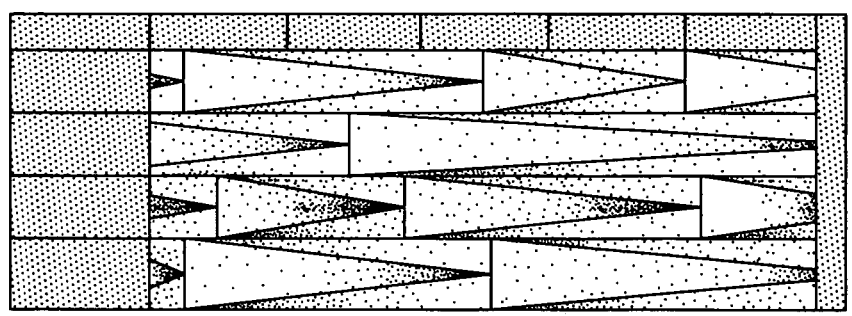
Figure 7:
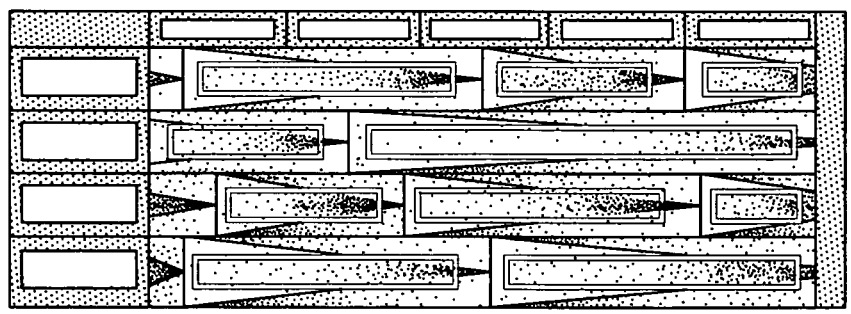

Next, borders and labels are added to the elements within the window, as seen in FIG. 6 to complete the graphical portion of the EPG. The completed program guide appears in FIG. 7, with the beginning and end times of the programs outside the window ascertainable by virtue of the change in the element background as described above. The completed EPG will contain labels or headers identifying the programs as well as the program sources and time intervals.

Figure 8:
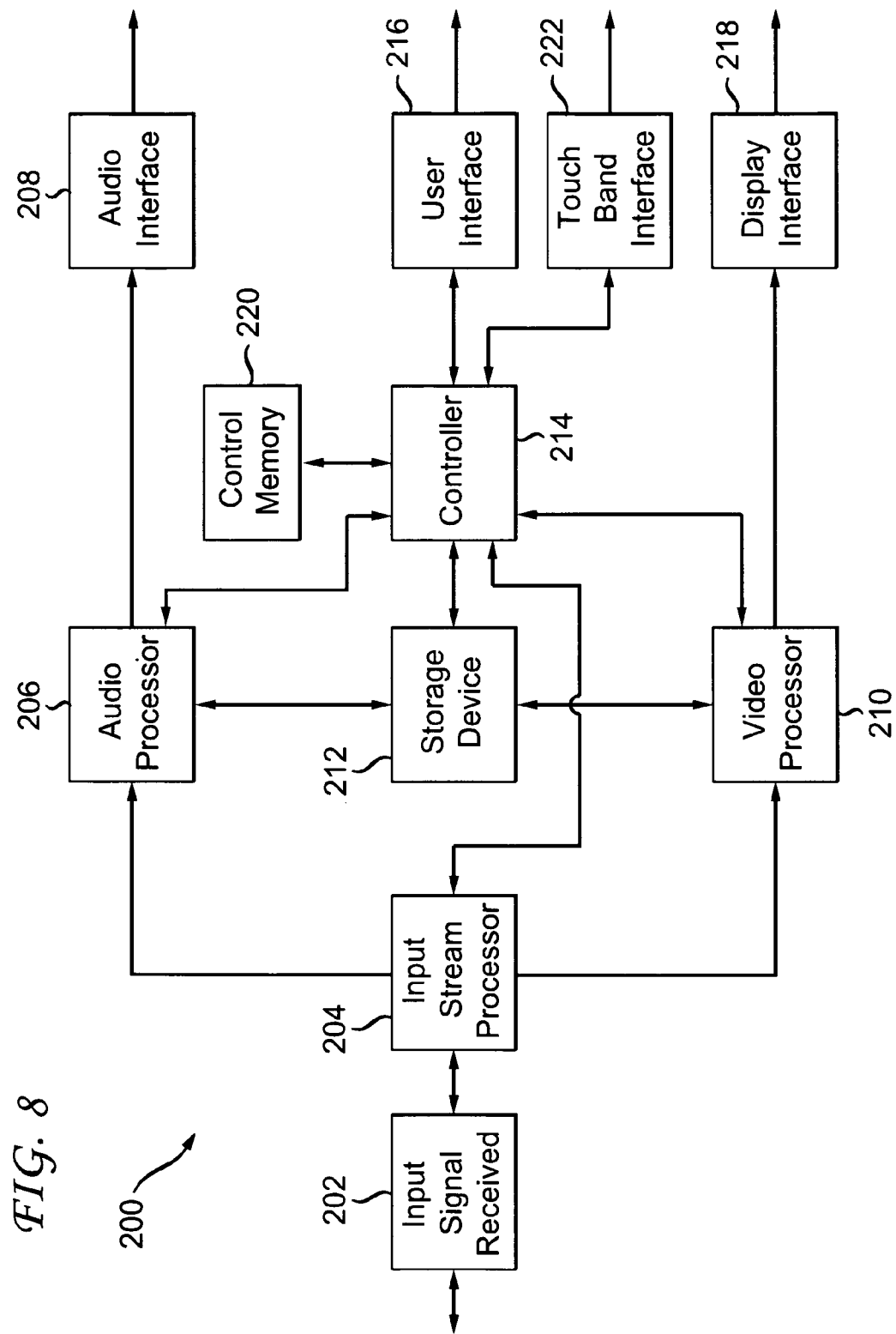
FIG. 8 depicts a block schematic diagram of an apparatus for generating the program guide of FIGS. 1A-1C.

FIG. 8 depicts a block schematic diagram of an exemplary receiving device 200, for example, a set-top box, capable of generating the EPGs 10, 100, and 1000 of FIGS. 1A-1C, respectively. The receiving device 200 of FIG. 2 includes an input signal receiver block 202. The input signal receiver block 202 can comprise one of several known receiver circuits used for receiving, demodulating, and decoding signals received from one of several possible networks including over the air, cable, satellite, Ethernet, fiber and phone line networks. Selection of a desired input signal for retrieval by the input signal receiver block 202 occurs in accordance with user input provided through a control interface or touch panel interface 222. Touch panel interface 222 can include an interface for a touch screen device. Touch panel interface 222 can also include an interface to a cellular phone, a tablet, a mouse, a high end remote or the like.

The input receiver block 202 provides a decoded output signal to an input stream processor 204. The input stream processor 204 performs the final signal selection and processing, and serves to separate video content from audio content for the content stream. An audio processor 206 converts the audio from the received format, such as compressed digital signal, to an analog signal. An audio interface 208 receives the analog audio and distributes the audio to a display device (not shown) or audio amplifier. Alternatively, the audio interface 208 can provide a digital signal to an audio output device (not shown) or to the display device using a High-Definition Multimedia Interface (HDMI) cable or alternate audio interface such as via a Sony/Philips Digital Interconnect Format (SPDIF). The audio interface 208 can also include amplifiers (not shown) for driving one more sets of speakers. The audio processor 206 also performs any necessary conversion for the storage of the audio signals.

A video processor 210 receives the video from the input stream processor 204. The video signal can have one or more formats. The video processor 210 converts the video content, as necessary, based on the input signal format. The video processor 210 also performs any necessary conversion for the storage of the video signals.

A storage device 212 can store input audio and video content. The storage device 212 allows later retrieval and playback of the content under the control of a controller 214 and also based on commands, e.g., navigation instructions such as fast-forward (FF) and rewind (Rew), received from a user interface 216 and/or the touch panel interface 222. The storage device 212 can comprise a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal from the video processor 210 can originate from either the input stream processor 204 or from the storage device 212. The video processor 210 provides the converted video to the display interface 218. The display interface 218 further provides the display signal to a display device of the type described above. The display interface 218 can comprise an analog signal interface such as red-green-blue (RGB) or a digital interface such as HDMI.

A bus links the controller 214 to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above.

The controller 214 has access to a control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 can store instructions for controller 214. The control memory 220 can also store a database of elements, such as graphic elements containing content. The database can comprise a stored pattern of graphic elements. Alternatively, the control memory 220 can store the graphic elements in identified or grouped memory locations and can access or make use of or location table to identify the memory locations for the various portions of information related to the graphic elements.

Further, the control memory 220 can include several possible embodiments, such as a single memory device or, alternatively, more than one memory circuit communicatively connected or coupled together to form a shared or common memory. Still further, the control memory 220 can reside with other circuitry, such as portions of bus communications circuitry, in a larger circuit. The user interface 220 can includes an interface for a microphone. The interface can comprise a wired or wireless interface, allowing for the reception of the audio signal for use in the present embodiment.

In accordance with the present principles, the video processor 210 possesses the capability of generating the EPGs. 10, 100, and 1000 of FIGS. 1A-1C. In practice, the input content received by the input signal receiver block 202 of FIG. 8, as well as the content stored by the storage device 212 of FIG. S will contain information as to the start and end times of the programs, as well as the identity of the program source.

Knowing such information, the video processor 210 of FIG. 8 can generate an EPG formed of a grid array whose elements contain information identifying a program from a particular program source played out during a corresponding time interval. Typically, the video processor will generate the EPG in accordance with the method depicted in FIGS. 2-7. In particular, the video processor 210 of FIG. 8 can make the background of each element within the EPG change so as to indicate one of the beginning and ending of the program.

The foregoing describes a EPG which indicates the length of a program spanning beyond the currently displayed portion of the EPG.

The invention claimed is:

1. A method, executed by a processor, for providing an electronic program guide, comprising the steps of:
    forming a grid array of elements by the processor, with each element corresponding to a window in time and each element having a foreground legend identifying at least a portion of a program from a particular program source appearing during a time interval associated with said each element, and
    providing elements by the processor with a background having a contrasting half-oval color shape having a span in correspondence with program length, such that the half-oval shape has a visible portion beginning in a corresponding element at a time corresponding to program commencement and ending in the corresponding element at a time corresponding to program conclusion.

2. A processor for generating an electronic program guide for display on a display device, the electronic program guide generated by the processor comprising:
    a grid array of elements, with each element corresponding to a window in time and each element having a foreground legend identifying at least a portion of a program from a particular program source appearing during a time interval associated with said each element, and
    each element having a background having a contrasting half-oval color shape having a span in correspondence with program length, such that the half-oval shape has a visible portion beginning in a corresponding element at a time corresponding to program commencement and ending in the corresponding element at a time corresponding to program conclusion.

* * * * *